(12) United States Patent
Chen et al.

(10) Patent No.: US 7,347,110 B1
(45) Date of Patent: Mar. 25, 2008

(54) TACTILE SENSING DEVICE AND AN APPARATUS USING THE SAME

(75) Inventors: Chiu-Wang Chen, Changhua County (TW); Chin-Chong Chiang, Miaoli County (TW); Yao-Jiunn Chen, Taipei (TW); Yaw-Nan Lee, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 11/675,217

(22) Filed: Feb. 15, 2007

(30) Foreign Application Priority Data

Dec. 19, 2006 (TW) .............................. 95147629 A

(51) Int. Cl.
*G01L 5/00* (2006.01)
(52) U.S. Cl. ................................ 73/862.55; 361/283.1
(58) Field of Classification Search .................. 73/700, 73/862.55; 361/283.1
See application file for complete search history.

(56) References Cited

U.S. PATENT DOCUMENTS

| | | | | |
|---|---|---|---|---|
| 4,306,148 A | * | 12/1981 | Ringwall et al. | ............ 250/229 |
| 4,584,625 A | * | 4/1986 | Kellogg | ................... 361/283.1 |
| 4,668,861 A | * | 5/1987 | White | .................. 250/227.21 |
| 5,373,747 A | | 12/1994 | Ogawa et al. | |
| 5,821,433 A | * | 10/1998 | Goldman et al. | ......... 73/862.55 |
| 6,154,580 A | * | 11/2000 | Kuriyama et al. | .......... 382/312 |
| 7,004,039 B1 | * | 2/2006 | Ford et al. | ............. 73/862.581 |

FOREIGN PATENT DOCUMENTS

JP 2005-27983 2/2005

* cited by examiner

*Primary Examiner*—Andre J. Allen
(74) *Attorney, Agent, or Firm*—WPAT, P.C.; Justin I. King

(57) ABSTRACT

The present invention provides a tactile sensing device comprising a tactile sensing layer, a pressure adjusting unit, at least one pressure sensing unit and a control unit. The tactile sensing layer includes a plurality of elastic elements, each of which has an inner space. The pressure adjusting unit coupled to the tactile sensing layer functions to provide and control variation of the pressure in the inner space of each elastic element. The control unit is coupled to the air supply unit and the at least one pressure sensing unit. The control unit is capable of receiving sensing signal from the at least one pressure sensing unit. In addition, the present invention also provides an apparatus whose surface is covered by the tactile sensing device. With the foregoing disclosure, it is capable of detecting the location and magnitude of the force acted on the tactile sensing device disposed on the surface of the apparatus through sensing the variation of pressure occurred in the elastic elements. Meanwhile, it is also able to change the softness of the tactile sensing device by controlling the air pressure inside the elastic elements.

19 Claims, 11 Drawing Sheets

TACTILE SENSING DEVICE AND AN APPARATUS USING THE SAME

FIELD OF THE INVENTION

The present invention relates to a sensing device, and more particularly, to a tactile sensing device, being manufactured as a matrix of a plurality of elastic airbags, not only capable of detecting the pressure variation of each airbag and thus recognizing the magnitude and position of a touch, but also capable of being adapted to adhere upon the surface of an apparatus so as to introduce different degrees of softness thereto by changing inner pressure of each airbag through the use of an air supply and an adjustable mechanism.

BACKGROUND OF THE INVENTION

Traditionally, robots, toys, or static/dynamic platform apparatuses are all manufactured with solid and firm appearance that usually appear to be lifeless and rejecting. With the rapid technology development in recent years, those conventional apparatuses of solid appearance are gradually being equipped with tactile sensing ability. Nevertheless, the tactile sensing ability is usually being achieved by the use of mechanical switch sensors or by attaching tactile/force sensors on the surface of those apparatuses. One of which is a robot with tactile sensing ability disclosed in JP Pat. No. 200527983, which use a piezoelectric element, covering the whole surface of the robot, as tactile sensor for detecting the magnitude and position of a touch. It is noted that although those prior-art tactile sensors are able to provide any apparatus attached thereby with tactile sensing ability, the appearance of such apparatus is still rigid and hard.

In addition, except for the hard and rigid appearance, those prior-art tactile sensors can not introduce any degree of softness to the apparatus attached thereby. Therefore, certain methods had been developed for improving the aforesaid softness problem. One of which is a finger-tip sensor disclosed in U.S. Pat. No. 5,373,747, which is substantially an elastic finger-shaped cap, filled with incompressible fluid, capable of detecting a contact pressure through the incompressible fluid by a pressure detector arranged therein. However, although the aforesaid patent is capable of providing a soft surface while detecting the magnitude and position of a touch at the same time, it can not introduce different degrees of softness to the surface.

Therefore, it is in need of a tactile sensing device and the apparatus using the same that are free from the foregoing shortcomings.

SUMMARY OF THE INVENTION

It is, therefore, the primary object of the present invention to provide a tactile sensing device, being manufactured as a matrix of a plurality of elastic airbags, not only capable of detecting the pressure variation of each airbag and thus recognizing the magnitude and position of a touch, but also capable of being adapted to adhere upon the surface of an apparatus so as to introduce different degrees of softness thereto by changing internal pressure of each airbag through the use of an air supply and an adjustable mechanism.

It is another object of the invention to provide an apparatus having a tactile sensing device covering its outer surface to be used as an interface of human-robot interaction (HRI) for enhancing the interactivities of the apparatus or robots.

Yet, another object of the invention is to provide a tactile sensing device, adapted to be used as the skin of arms or body of an moving apparatus, by which different degrees of skin softness can be introduced to the moving apparatus with respect to the operating speed of the apparatus as well as its ambient environment so as to protect the operating structure or the main body of the apparatus from being damaged from collision.

Further, another object of the invention is to provide a tactile sensing device, adapted to be used as the skin of a robotic apparatus, by which different degrees of skin softness can be introduced to the robotic apparatus so as to provide and adjust a grasping force of a grasp mechanism of the robotic apparatus in a manner that an object fetched by the grasp mechanism is prevented from slipping and dropping and thus the safety of using the robotic apparatus to perform a grasping operation is enhanced.

Furthermore, another object of the invention is to provide a tactile sensing device, adapted for a mobile apparatus to be used as a sensor for collision detecting, which is capable of detecting an impact of a collision between the mobile apparatus and an ambient object with respect to the magnitude and position of the collision while feeding back the detected information to the mobile apparatus to be used for adjusting the softness as well as the moving speed of the mobile apparatus and thus preventing the mobile apparatus and the ambient object from being damaged by the collision.

To achieve the above object, the present invention provides a tactile sensing device, comprising: a tactile sensing layer, including a plurality of elastic elements, each having an inner space formed therein; a pressure adjusting unit, connected to the tactile sensing layer by a piping system for adjusting and controlling the inner space pressure of each elastic element; at least a pressure sensing unit, each for measuring a pressure of one of the plural elastic element corresponding thereto; and a control unit, coupled to the pressure adjusting unit and the at least one pressure sensing unit, capable of receiving a sensing signal detected by the at least one pressure sensing unit.

In a preferred aspect, the present invention further provide an apparatus, comprising: a moving object; a tactile sensing layer, covering the moving object while being composed of a plurality of elastic elements, each having an inner space formed therein; a pressure adjusting unit, connected to the tactile sensing layer by a piping system for adjusting and controlling the inner space pressure of each elastic element; at least a pressure sensing unit, each for measuring a pressure of one of the plural elastic element corresponding thereto; and a control unit, coupled to the pressure adjusting unit and the at least one pressure sensing unit, capable of receiving a sensing signal detected by the at least one pressure sensing unit to be used for controlling the moving object to interact accordingly.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
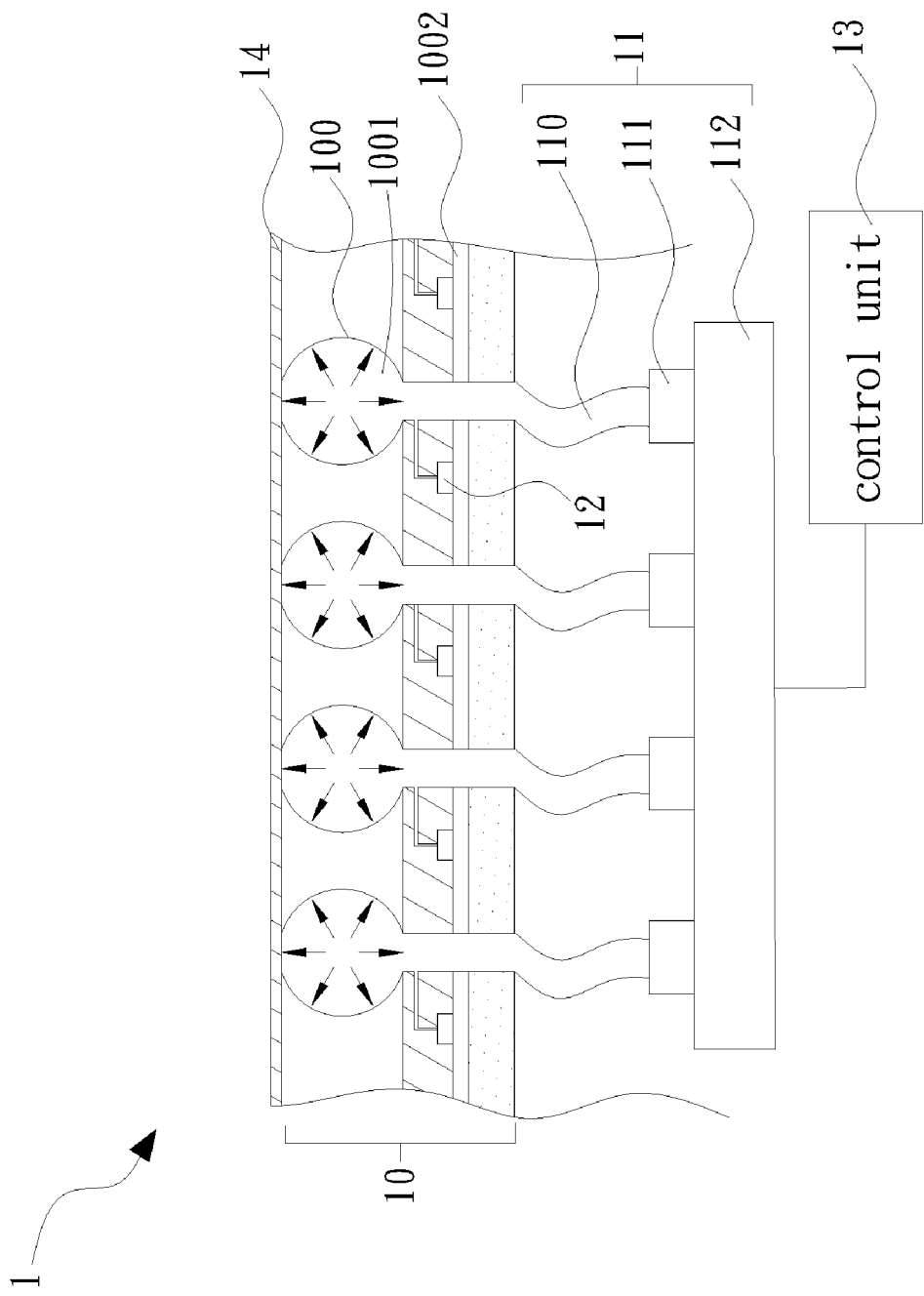
FIG. 1 is a schematic view of a tactile sensing device according to a preferred embodiment of the invention.

Please refer to FIG. 1, which is a schematic view of a tactile sensing device according to a preferred embodiment of the invention. The tactile sensing device 1 is comprised of: a tactile sensing layer 10; a pressure adjusting unit 11, connected to the tactile sensing layer 10 by a piping system 110 for adjusting and controlling the inner space pressure of each elastic element 100; a plurality of pressure sensing unit 12; and a control unit 13; wherein, the tactile sensing layer 10 is composed of a plurality of elastic elements 100, each having an inner space 1001 formed therein. In this preferred embodiment, each elastic element 100 is an airbag made of an elastic material; and the pressure adjusting unit 11 is further composed of a plurality of multiplex switches 111 and a pressure control unit 112, in which the pressure control unit 112 controls the pressure of a fluid while the multiplex switch 111 is used to control the fluid to flow in or out one inner space 1001 of the plural elastic elements 100 corresponding thereto. Thus, the inner space pressure of the selected elastic element 100 is changed accordingly which further cause the selected elastic element 100 to expand or contract.

Each of the plural pressure sensing unit 12 is used for detecting the pressure of one corresponding inner space 1001 of the plural elastic elements 100 and thus generating a sensing signal accordingly. The sensing signal is then transmitted to the control unit 13 through a flexible printed circuit board 1002 for enabling the control unit 13 to use the sensing signal to recognize the magnitude and position of a touch contacting the tactile sensing layer 10. Moreover, the control unit 13 is connected to the pressure adjusting unit 11, by which the control unit 13 is able to use the received sensing signal to control the pressure adjusting unit 11 and thus changing the degree of softness of the tactile sensing layer 10 accordingly. In addition, a protective layer 14 is formed on top of the tactile sensing layer 10 for protecting the same from being damaged by an external force.

Figure 2A:
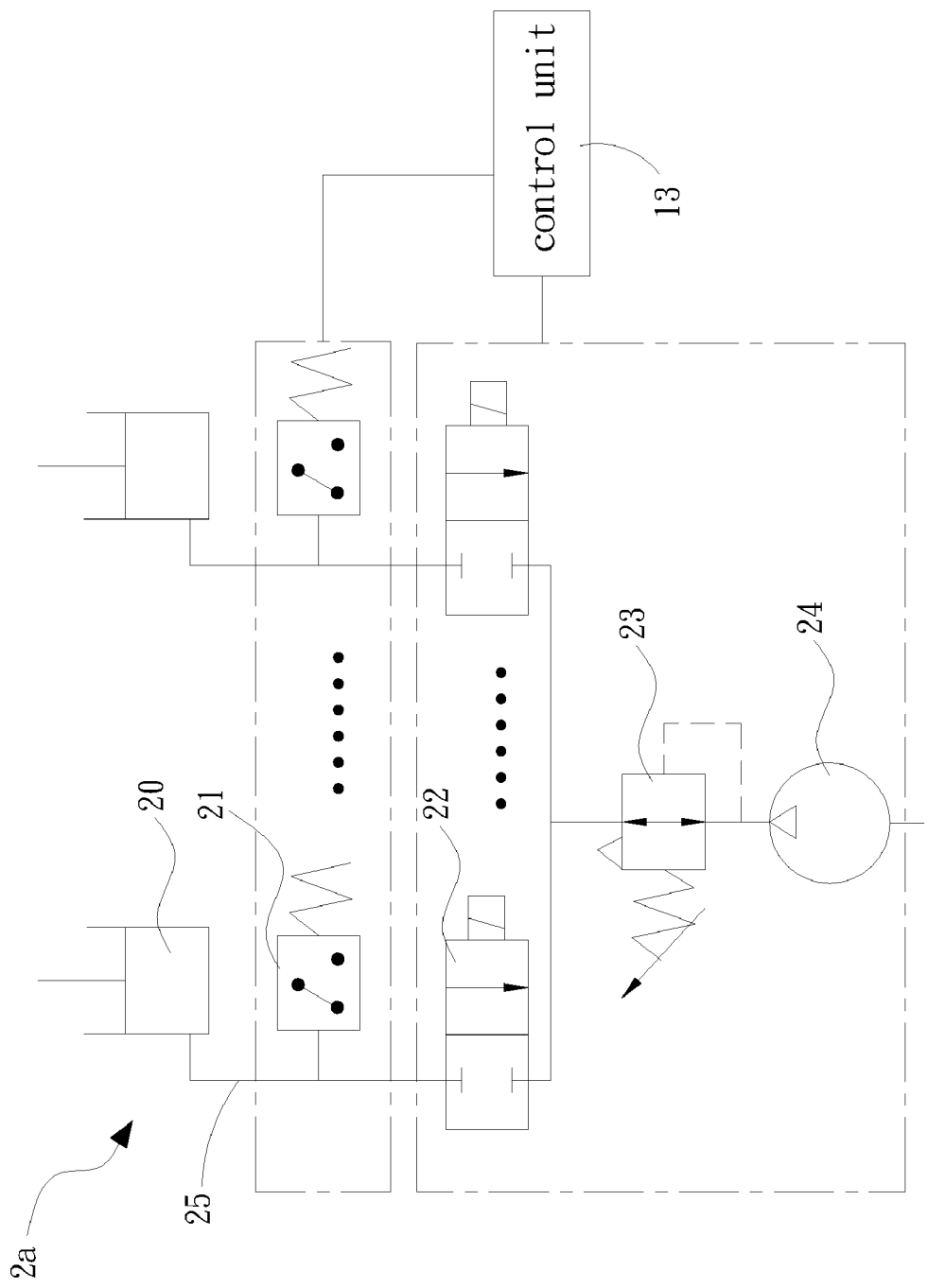
FIG. 2A is a schematic diagram illustrating an equivalent pressure system of a tactile sensing device of the invention.

Please refer to FIG. 2A, which is a schematic diagram illustrating an equivalent pressure system of a tactile sensing device of the invention. By representing a tactile sensing device of FIG. 1 as an equivalent pressure system, as seen in FIG. 2A, each elastic element 20 of a tactile sensing device 2a is represented as a cylinder; each pressure sensing unit 12 of FIG. 1 can be equivalently represented as the pressure sensor 21 of FIG. 2A; and the pressure adjusting unit 11 of FIG. 1 can be represented by the composition of a plurality of multiplex switches 22, a pressure regulator 23 and a pressure supply 24. In this preferred embodiment, the pressure regulator 23 is substantially an air pressure regulator and the pressure supply is a source of air pressure, moreover, signal of the pressure sensor 21 is transmitted to the control unit 13. It is noted that although air pressure is used for illustrating pressure control of the invention, it is not limited thereby, for instance, hydraulic pressure can also be adapted as the pressure source of the invention.

The plural multiplex switches 22 are respectively connected to the plural elastic elements 20, and each of the multiplex switches 22 is further electrically connected to the control unit 13 by the use of electrical control signals. Each multiplex switch 22 can be switched to control flowing direction of an air to flow in or out its corresponding elastic element 20. The pressure regulator 23 is connected to the plural multiplex switches 22 in respective and is further electrically connected to the control unit 13 by the use of electrical control signals. The pressure regulator 23 is used for regulating the inner pressure of the elastic elements 20. The pressure supply 24 is connected to the pressure regulator 23. The control unit 13 is able to control the pressure regulator 23 and the multiplex switches 22 for regulating the inner pressure of each elastic element 20.

Figure 2B:
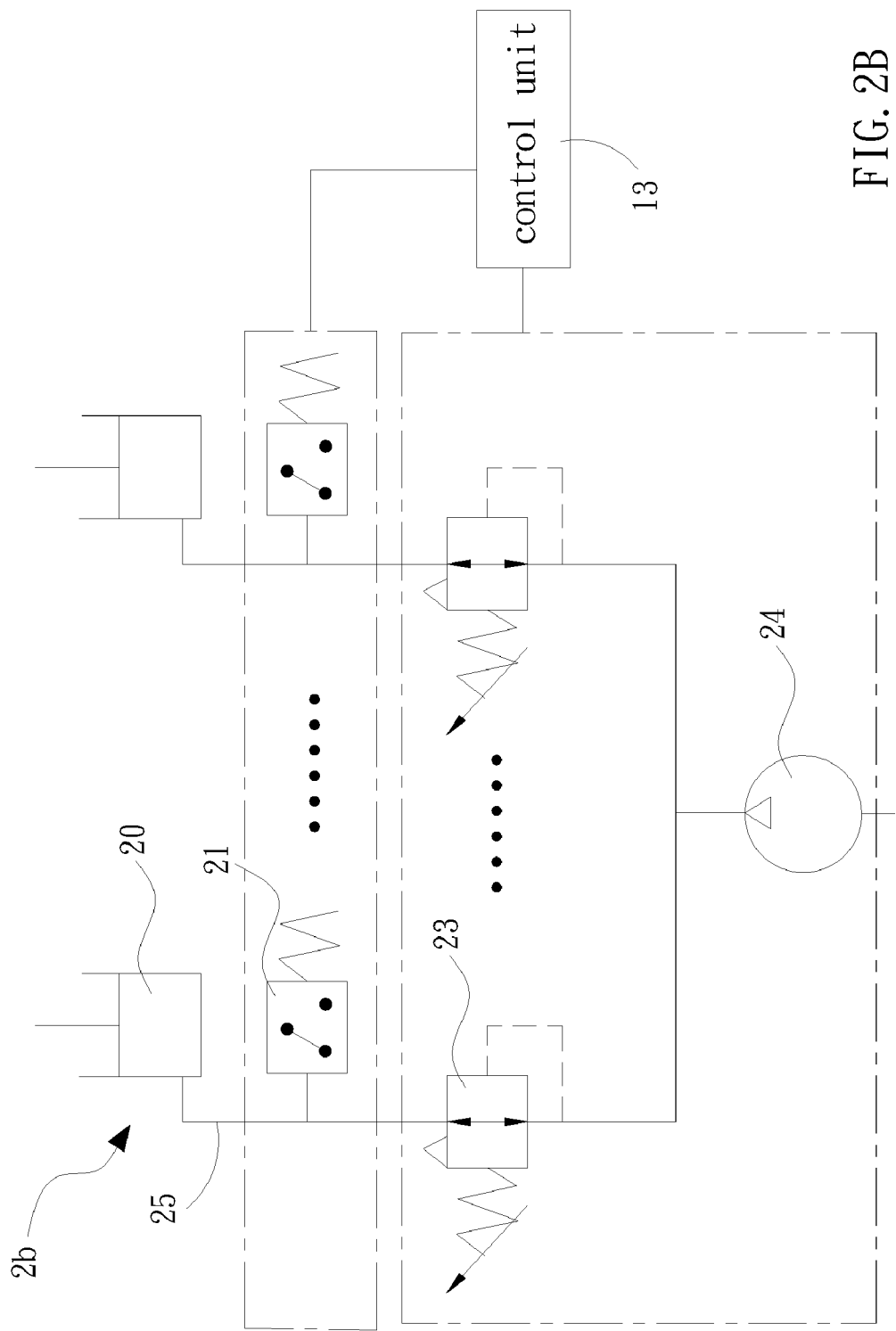
FIG. 2B is a schematic diagram illustrating another equivalent pressure system of a tactile sensing device of the invention.

Other than that shown in FIG. 2A, another such equivalent pressure system of a tactile sensing device is shown in FIG. 2B. In FIG. 2B, the pressure adjusting unit of a tactile sensing device 2b is composed of a plurality of pressure regulators 23 and a pressure supply 24, in which the plural pressure regulators are respectively connected to a plurality of elastic elements 20 of the tactile sensing device 2b and each is further electrically connected to the control unit 13 by the use of electrical control signals; and the pressure supply 24 is connected to the plural pressure regulators 23. As each regulator 23 is connected directly to it corresponding elastic element 20 that it can be used for regulating the inner space pressure of its corresponding elastic element 20 directly without the help of the multiplex switch as that shown in FIG. 2A.

Figure 3A:
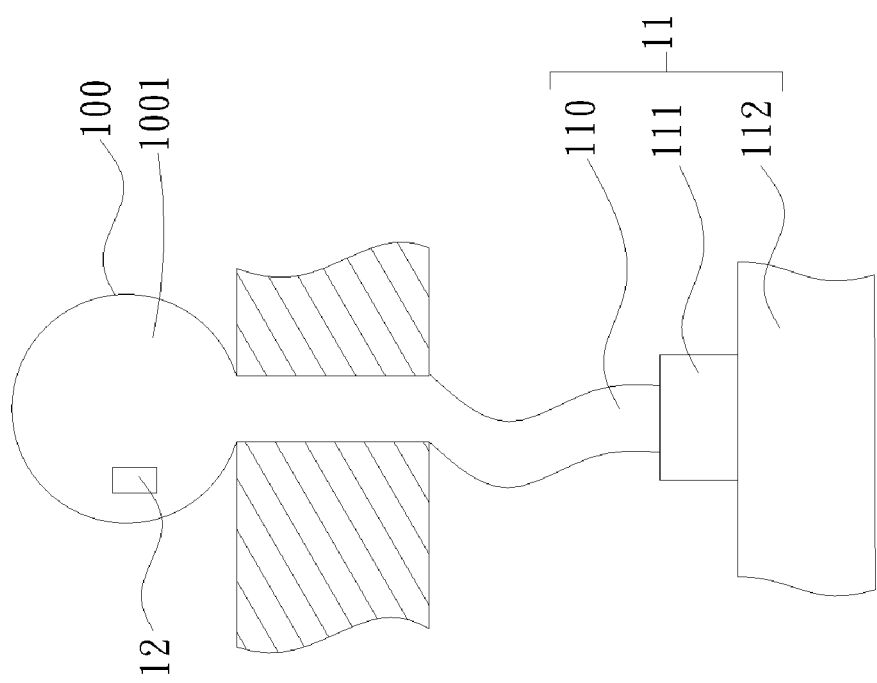
FIG. 3A shows a pressure sensing unit being disposed inside an inner space of an airbag according to a preferred embodiment of the invention.
Figure 3B:
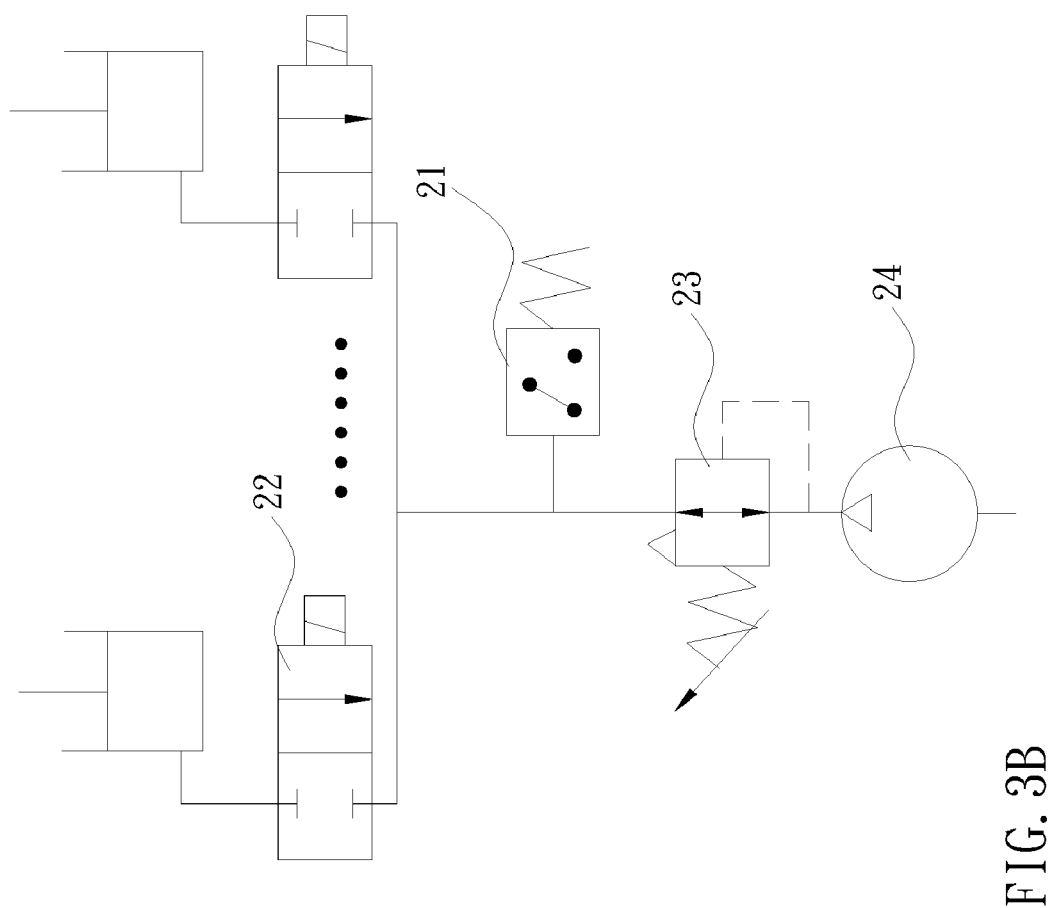
FIG. 3B shows a pressure sensing unit being disposed between multiplex switches and a pressure regulator according to a preferred embodiment of the invention.

In FIG. 1, each pressure sensing unit 12 is arranged at a side of its corresponding piping 110, so that it can detect pressure variations in the piping 110 and thus the pressure variation of the inner space of the corresponding elastic element 100 is detected. Please refer to FIG. 3A, which shows a pressure sensing unit being disposed inside an inner space of an airbag according to a preferred embodiment of the invention. As seen in FIG. 3A, each pressure sensing unit 12 can be disposed inside an inner space 1001 of its corresponding elastic element 100 for directly detecting pressure of that inner space 1001. Moreover, FIG. 3B shows an individual pressure sensor 21 being disposed between a plurality of multiplex switches 22 and a pressure regulator 23, in that the pressure sensor 21 can be switch to detect air pressure of different elastic element by the switch control of the plural multiplex switches 22.

Figure 4:
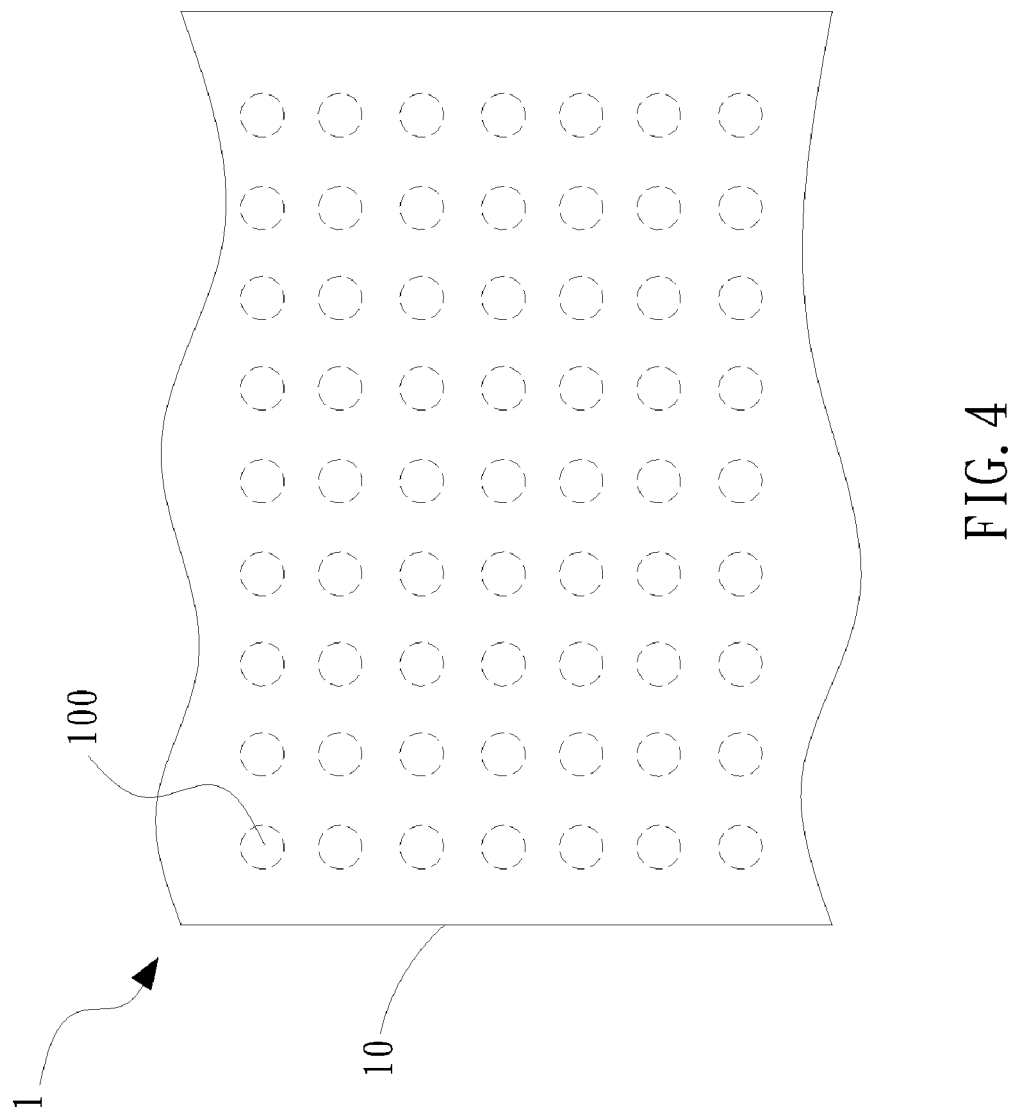
FIG. 4 is a schematic diagram showing a plurality of elastic elements being arranged in a matrix.

Please refer to FIG. 4, which is a schematic diagram showing a plurality of elastic elements being arranged in a matrix. As the plural elastic elements 100 are arranged as a matrix in the tactile sensing layer 10, the magnitude and position of a touch contacting the tactile sensing layer 10 can be detected.

Figure 5A:
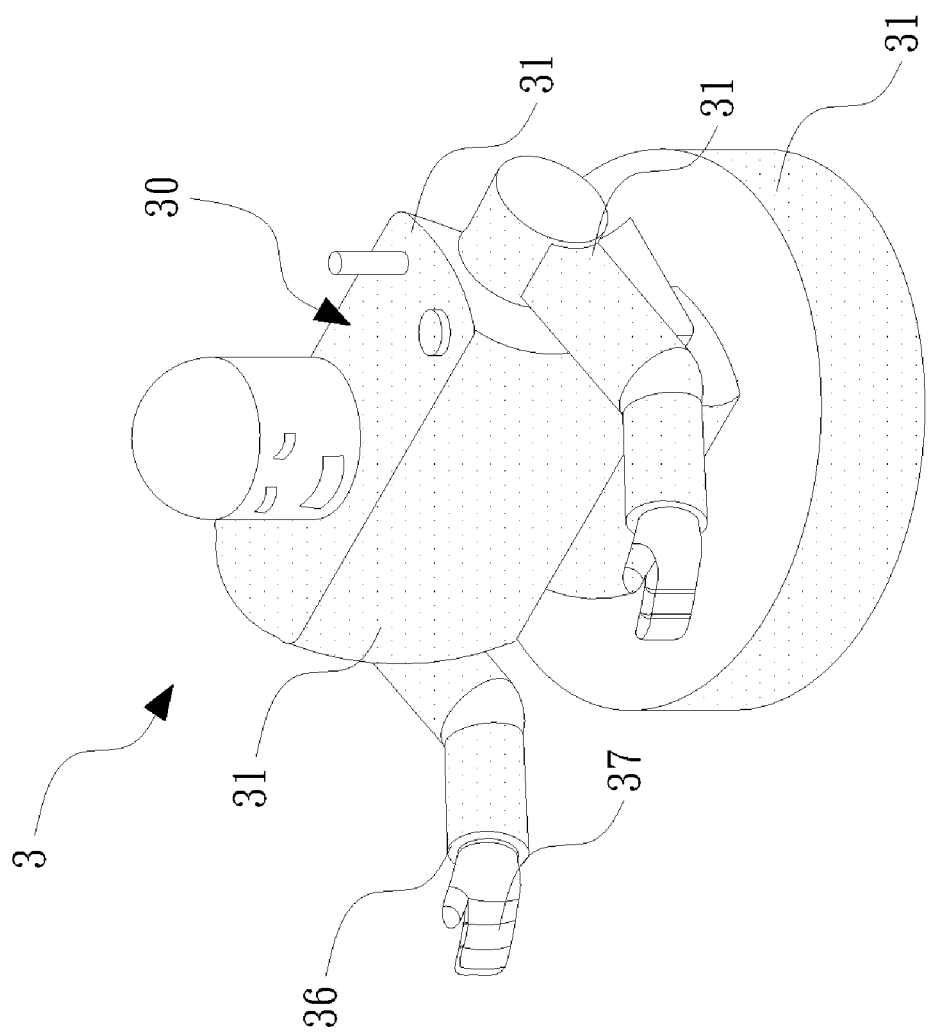
FIG. 5A shows a robotic apparatus according to a preferred embodiment of the invention.

Please refer to FIG. 5A, which shows a robotic apparatus according to a preferred embodiment of the invention. The robotic apparatus 3 of FIG. 5A is comprised of a moving object 30, a tactile sensing layer 31, a pressure adjusting unit 34, at least a pressure sensing unit 33 and a control unit 32. In a preferred aspect, the moving object 30 is a robot, integrating a plurality of body modules for motion expression, selected from the group consisting of an industrial robotic arm, a mobile robot, an interactive robot, a guidance robot, a security robot, a homecare robot, an education robot, and an entertainment robot. In addition, the moving object 30 is a device selected from the group consisting of a toy with motion expression ability, a portable electronic device with movement expression ability, a billboard of complicated curved surfaces with movement expression ability, and a performance device with movement expression ability. In this preferred embodiment of FIG. 5A, the moving object 30 is a robot.

As seen in FIG. 5A, the tactile sensing layer 31, being composed of a plurality of elastic elements, is covering all or partial exterior surface of the moving object 30. In this preferred embodiment, the tactile sensing layer 31 is used as the skin of the moving object 30 for enabling the moving object 30 to have various appearances. It is noted that the pressure adjusting unit 34 and the pressure sensing unit 33 are similar to those illustrated hereinbefore and thus are not described further herein. The control unit 32 is capable of receiving magnitude and position of a touch contacting the tactile sensing layer 31 and detecting by the pressure sensing unit 33 for controlling the moving object 30 to response interactively.

Figure 5B:
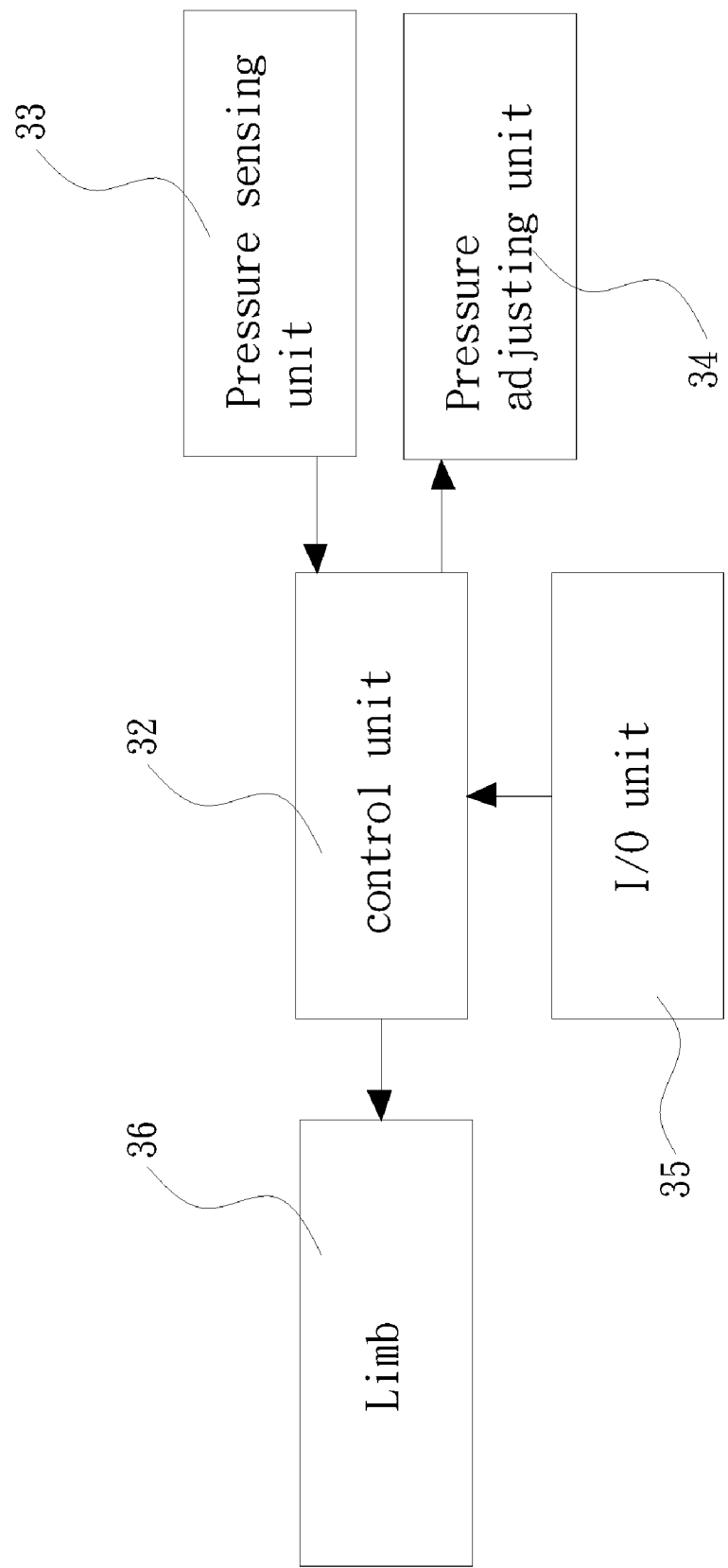
FIG. 5B is a function block diagram depicting a robotic apparatus of the invention.

Please refer to FIG. 5B, which is a function block diagram depicting a robotic apparatus of the invention. As seen in FIG. 5B, the control unit 32 of the robotic apparatus is further connected to an input/output (I/O) interface unit 35, capable of connecting to a sensor, an imager, a display, a signal light or a speaker, and so on. Moreover, the control unit 32 is able to control limbs 36 of the moving object 30 to perform a movement. In this embodiment, the control unit 32 uses signals detecting by the pressure sensing unit 33 relating to magnitude and position of a touch contacting the tactile sensing layer 31 for controlling the limb 36 to respond interactively with an operator, or to display information and signal by the I/O interface unit 35. Since the tactile sensing layer 31 is capable of displaying different degrees of softness, the surface tension or softness of the moving robotic apparatus can be changed in response to a touch contacting its surface, or even it is able to simulate tension variation of human muscle for improving the versatility and interactivity of the robotic apparatus 3.

Figure 5C:
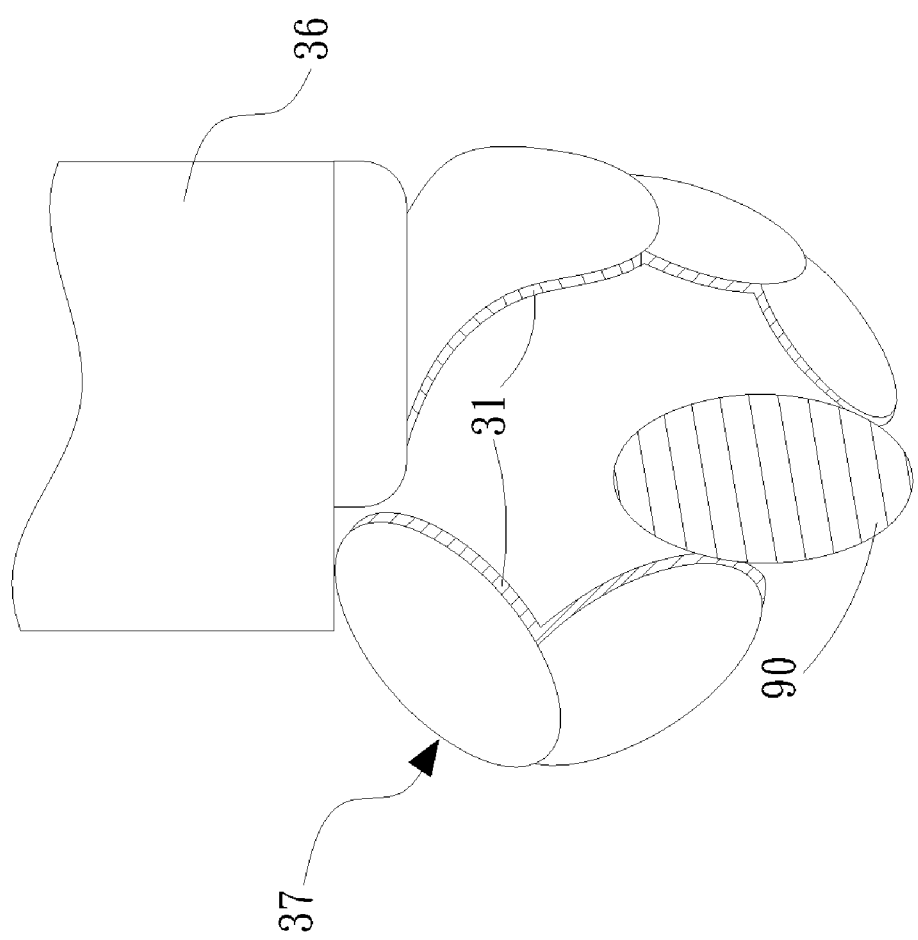
FIG. 5C is a schematic diagram showing an object being grabbed by fingers of a robotic apparatus of the invention.

Please refer to FIG. 5C, which is a schematic diagram showing an object being grabbed by fingers of a robotic apparatus of the invention. As seen in FIG. 5C, a finger of the limb 36 is further equipped with a grasp mechanism 37, which is also covered by a tactile sensing layer 31. As an object is fetched by the grasp mechanism 37, different degrees of skin softness can be introduced to the tactile sensing layer 31 so as to provide and adjust a grasping force of a grasp mechanism 37 in a manner that the object fetched by the grasp mechanism 37 is prevented from slipping and dropping. Conventionally, such grasping force can only provided by the mechanical components of the grasp mechanism 37, which have no contract/expand structure similar to softness of human muscle and thus any careless movement can easily damage the surface of the object fetched thereby. On the other hand, the grasping force of FIG. 5C is provided by two sources, one is the grasp mechanism 37 and the other is the tactile sensing layer 31, which further enhance the safety of using the robotic apparatus to perform a grasping operation.

Figure 6:
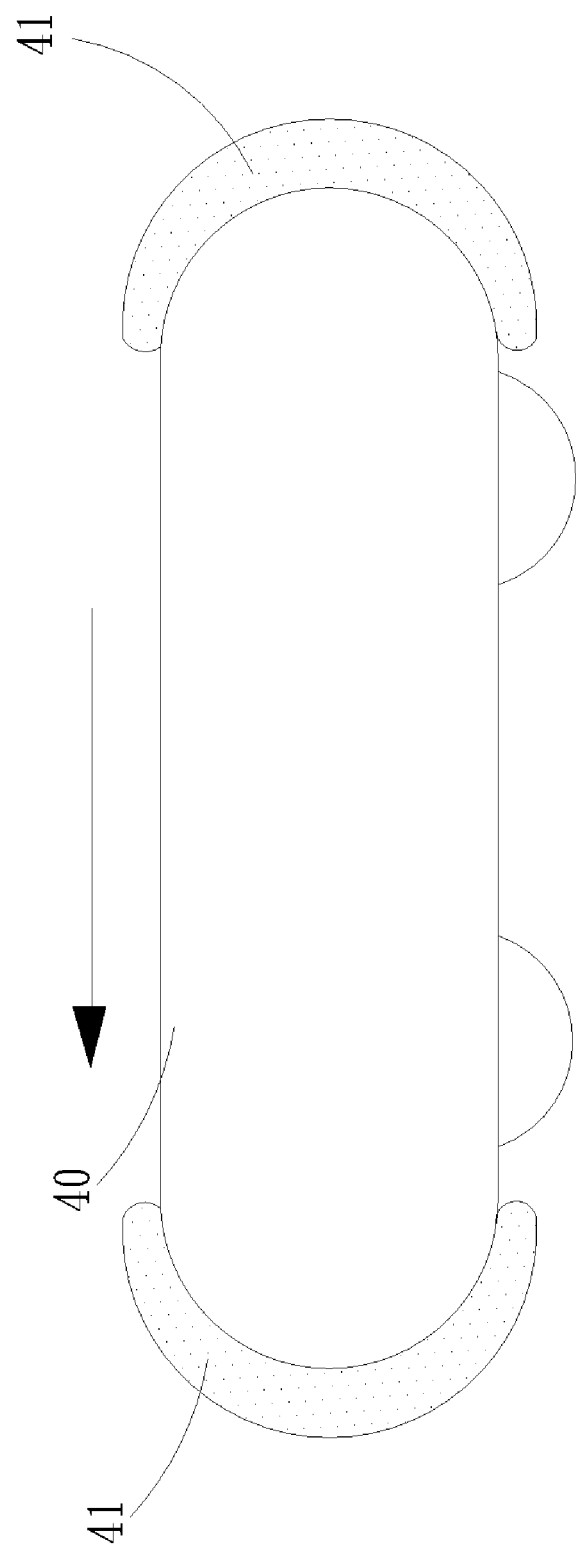
FIG. 6 is a schematic diagram showing a mobile platform wearing a tactile sensing device of the invention.

Please refer to FIG. 6, which is a schematic diagram showing a mobile platform wearing a tactile sensing device of the invention. In FIG. 6, as the apparatus is a mobile platform 40, such as a vehicle, or autonomous vacuum cleaner, it can be fitted with the aforesaid tactile sensing device 41 at the edge thereof, by which magnitude and position of a collision contacting the tactile sensing layer can be detected and used as edge/collision avoiding detection. Moreover, the tactile sensing device 41, adapted to on the moving platform 40, is able to introduce different degrees of skin softness to the mobile platform 40 with respect to the moving speed thereof as well as its ambient environment so as to protect the mobile platform 40 from being damaged from collision.

Figure 7:
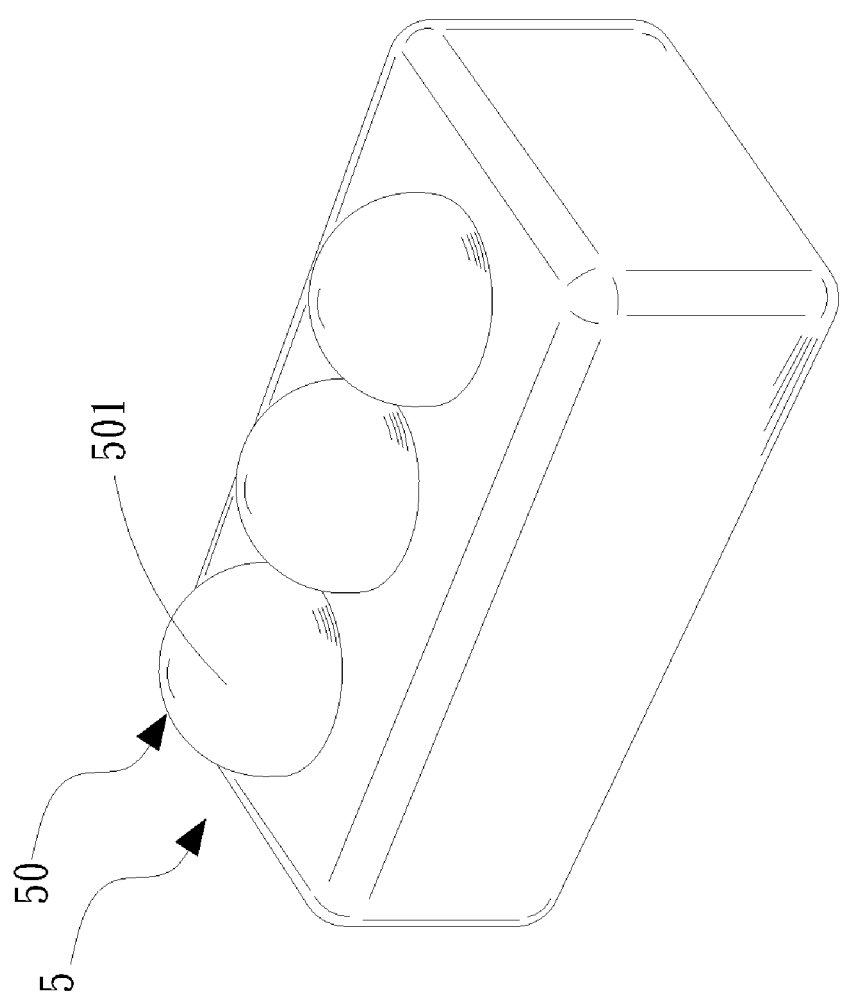
FIG. 7 shows an application of the tactile sensing device of the invention.

Please refer to FIG. 7, which shows an application of the tactile sensing device of the invention. The tactile sensing device 501 can be manufactured into various shapes. In this preferred embodiment, it is being shaped like three elastic balls fitted on a box, which can act as a pressure-relief toy 5 to be punched and kicked. When the tactile sensing device 501 is punched, the control unit embedded inside the pressure-relief toy 5 is able to respond to the punch by emitting a sound or change the degree of softness of the tactile sensing device 501, etc.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A tactile sensing device, comprising:
    a tactile sensing layer, including a plurality of elastic elements, each having an inner space formed therein;
    a pressure adjusting unit, connected to the tactile sensing layer by a piping system for adjusting and controlling the inner space pressure of each elastic element;
    at least a pressure sensing unit, each for measuring a pressure of one of the plural elastic element corresponding thereto; and
    a control unit, coupled to the pressure adjusting unit and the at least one pressure sensing unit, capable of receiving a sensing signal detected by the at least one pressure sensing unit for using the received sensing signal to control the activation of the pressure adjusting unit and thus changing the degree of softness of the tactile sensing layer accordingly.

2. The tactile sensing device of claim 1, further comprising:
    a protective layer, formed on top of the tactile sensing layer.

3. The tactile sensing device of claim 1, wherein the at least one pressure sensing unit is arranged inside the inner space of each elastic element for detecting pressure variation of the inner space.

4. The tactile sensing device of claim 1, wherein the at least one pressure sensing unit is arranged for enabling the same to detect pressure variations in the piping connecting one corresponding elastic element to the pressure adjusting unit so that the pressure variation of the inner space of the corresponding elastic element is detected.

5. The tactile sensing device of claim 1, wherein the pressure adjusting unit further comprises:
   a plurality of pressure regulators, respectively connected to the plural elastic elements and the control unit; and
   a pressure source, connected to the plural pressure regulators and the control unit.

6. The tactile sensing device of claim 1, wherein the pressure adjusting unit further comprises:
   a plurality of multiplex switches, respectively connected to the plural elastic elements and the control unit;
   at least a pressure regulators, respectively connected to the plural multiplex switches and the control unit; and
   a pressure source, connected to the at least one pressure regulator and the control unit.

7. The tactile sensing device of claim 1, wherein the plural elastic elements are arranged as a matrix in the tactile sensing layer.

8. The tactile sensing device of claim 1, wherein the control unit is capable of using the sensing signal received from the at least one pressure sensing unit to recognize the magnitude and position of a touch contacting the tactile sensing layer.

9. A apparatus, comprising:
   a moving object;
   a tactile sensing layer, covering the moving object while being composed of a plurality of elastic elements, each having an inner space formed therein;
   a pressure adjusting unit, connected to the tactile sensing layer by a piping system for adjusting and controlling the inner space pressure of each elastic element;
   at least a pressure sensing unit, each for measuring a pressure of one of the plural elastic element corresponding thereto; and
   a control unit, coupled to the pressure adjusting unit and the at least one pressure sensing unit, capable of receiving a sensing signal detected by the at least one pressure sensing unit for using the received sensing signal to control the activation of the pressure adjusting unit and thus changing the degree of softness of the tactile sensing layer as well as controlling the moving object to interact accordingly.

10. The apparatus of claim 9, further comprising:
    a protective layer, formed on top of the tactile sensing layer.

11. The apparatus of claim 9, wherein the at least one pressure sensing unit is arranged inside the inner space of each elastic element for detecting pressure variation of the inner space.

12. The apparatus of claim 9, wherein the at least one pressure sensing unit is arranged for enabling the same to detect pressure variations in the piping connecting one corresponding elastic element to the pressure adjusting unit so that the pressure variation of the inner space of the corresponding elastic element is detected.

13. The apparatus of claim 9, wherein the pressure adjusting unit further comprises:
    a plurality of pressure regulators, respectively connected to the plural elastic elements and the control unit; and
    a pressure source, connected to the plural pressure regulators and the control unit.

14. The apparatus of claim 9, wherein the pressure adjusting unit further comprises:
    a plurality of multiplex switches, respectively connected to the plural elastic elements and the control unit;
    at least a pressure regulators, respectively connected to the plural multiplex switches and the control unit; and
    a pressure source, connected to the at least one pressure regulator and the control unit.

15. The apparatus of claim 9, wherein the plural elastic elements are arranged as a matrix in the tactile sensing layer.

16. The apparatus of claim 9, wherein the control unit is capable of using the sensing signal received from the at least one pressure sensing unit to recognize the magnitude and position of a touch contacting the tactile sensing layer.

17. The apparatus of claim 9, wherein the moving object is a robot or an active mechanism, integrating a plurality of body modules for movement expression.

18. The apparatus of claim 17, wherein the robot is selected from the group consisting of an industrial robotic arm, a mobile robot, an interactive robot, a guidance robot, a security robot, a homecare robot, an education robot, an entertainment robot, and a mobile platform.

19. The apparatus of claim 9, wherein the moving object is a device selected from the group consisting of a toy with motion expression ability, a portable electronic device with movement expression ability, a billboard of complicated curved surfaces with movement expression ability, and a performance device with movement expression ability.

* * * * *